May 5, 1964 J. R. BARNEY 3,131,980

RECEIVER CABINET STRUCTURE

Filed Aug. 15, 1961 2 Sheets-Sheet 1

INVENTOR.
John R. Barney

BY Mueller & Aichele

Attys.

RECEIVER CABINET STRUCTURE

Filed Aug. 15, 1961 2 Sheets-Sheet 2

INVENTOR.
John R. Barney
BY Mueller & Aichele
Attys.

3,131,980
RECEIVER CABINET STRUCTURE
John R. Barney, Glenview, Ill., assignor to Motorola, Inc., Chicago, Ill., a corporation of Illinois
Filed Aug. 15, 1961, Ser. No. 131,544
4 Claims. (Cl. 312—7)

This invention relates to television receivers and more particularly to cabinet attachments for conversion of a receiver cabinet into a console-type cabinet.

The widespread use of television receivers in living-rooms, dens, or other relatively formal rooms of a home dictate that the cabinets for such receivers have a styling to match or complement that of the other furniture pieces in the room. Since there are many different furniture styles, this can greatly increase the number of different television receiver models which must be stocked in order to meet customer demands. It may be recognized that the storage and purchase of a number of varying styles of receivers can present undue costs and problems for television receiver sellers.

An object of the present invention is to permit a table model television receiver in a given cabinet to be easily modified into a console-type receiver of various different furniture styles.

Another object is to provide a simple and easily assembled base and decorative top for a television receiver.

A third object is to provide means for converting a single table model television receiver in a given cabinet to a console-type receiver of various different furniture styles with a minimum of necessary parts.

A feature of the invention is the provision of a television receiver the furniture styling of which is determined by a supporting base and decorative top attachable thereto.

Another feature is the provision of such a television receiver which is constructed basically as a table model receiver and which is attachable to the base by means of a single bolt and for permitting swivel movement of the receiver to facilitate viewing.

Still another feature is the provision of such a receiver in which the decorative top frame is pivotally mounted to the receiver.

In summary, the cabinet attachment includes a base or bench with four legs and a top. A center rail of the base is apertured to receive a pivotal mounting bolt for the cabinet of a television receiver. There are feet on the bottom of the receiver to act as glides for pivoting the receiver on the base and stops are included to limit the pivotal movement of the receiver. A rectangular frame is fitted around the top of the television receiver and rests directly thereon. The frame is secured to the receiver back by pivotal means. The frame and base are formed in a particular furniture style, such as Colonial or Modern, so that a given table model television receiver, complete in itself, can be altered to conform with whatever furniture style is desired by the user of the receiver.

Figures 1, 2, 7, 8:
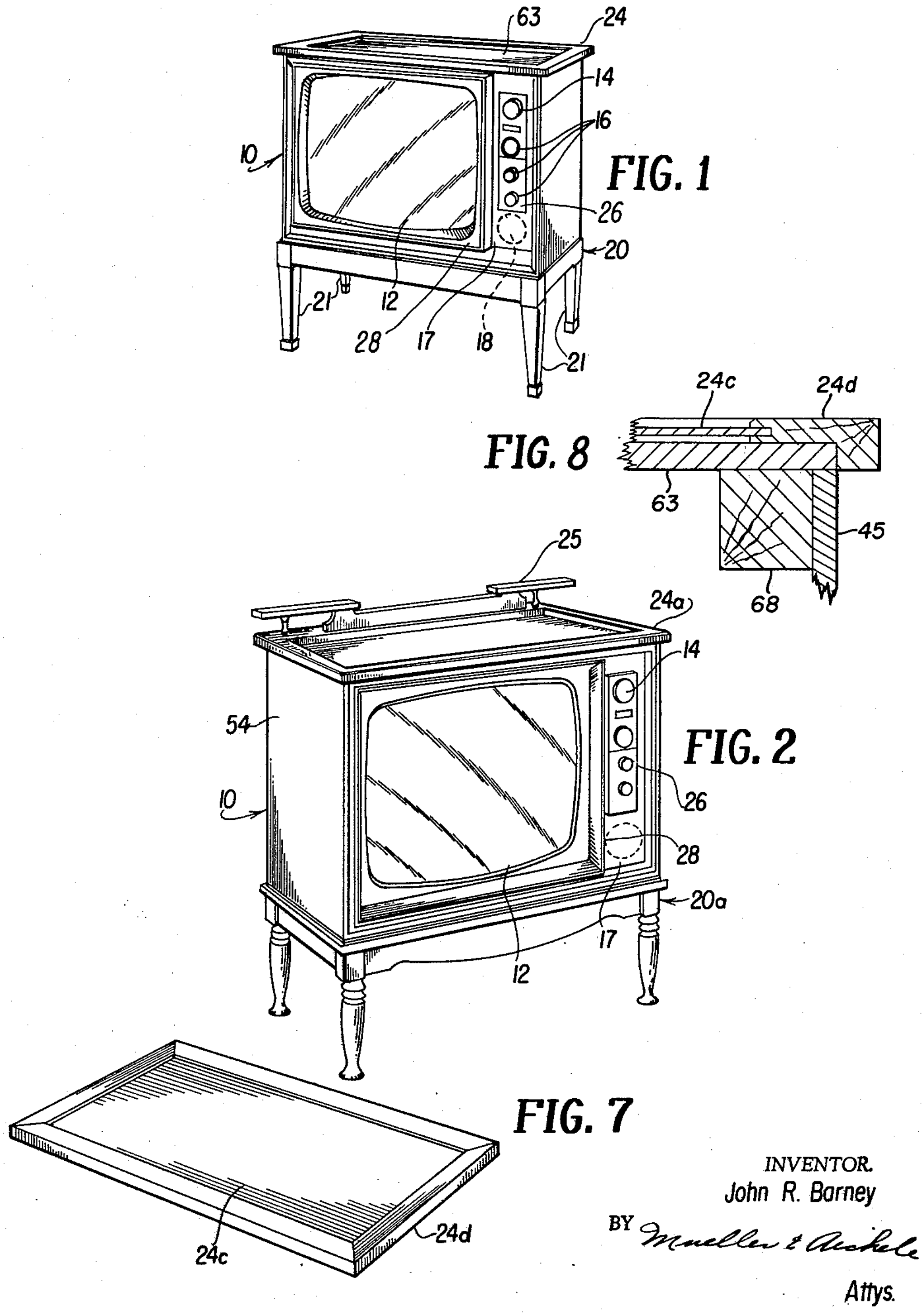
FIG. 1 is a perspective view of a television receiver assembly in accordance with the invention.
FIG. 2 is a perspective view of the receiver of FIG. 1 with a different base and top frame.
FIG. 7 is a perspective view of a modified top frame.
FIG. 8 is a cross-sectional view similar to FIG. 6, showing the top frame of FIG. 7.

In FIG. 1 there is a table model television receiver 10 housed in a rectangular cabinet which encloses the top, bottom, sides and back of the receiver. The picture tube screen is visible through the window 12 and the receiver is tuned by a knob 14. Other controls of the receiver are adjustable by means of knobs 16. A loudspeaker for the sound accompanying the picture, mounted behind grille cloth 17, is represented at 18.

Figure 3:
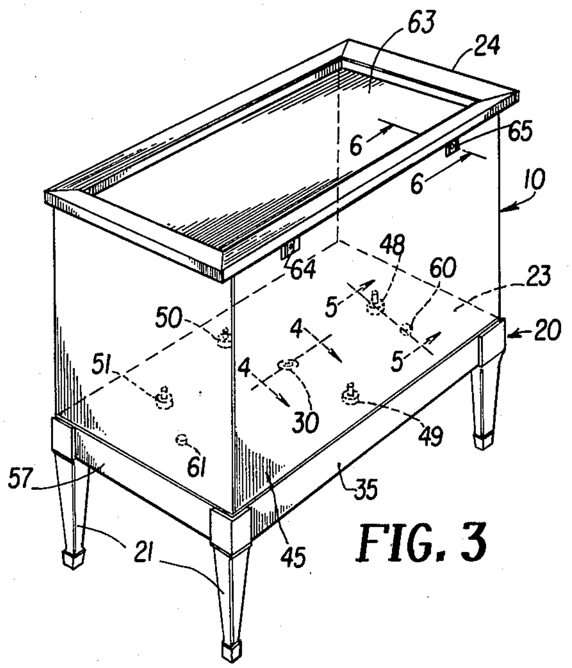
FIG. 3 is a rear perspective view of the unit of FIG. 1.

The receiver 10 is pivotally mounted on a bench or base 20 having legs 21 and a base top 23 (FIG. 3). It is preferable that this base top be finished to match the remainder of the receiver to provide an attractive appearance when the receiver is swiveled. A rectangular frame 24 is positioned over the top of the cabinet for receiver 10, and the frame 24 is formed in a style coordinate with the furniture styling of the base 20. It may be noted that the styling of FIG. 1 is Italian Provincial.

In FIG. 2 there is shown the same table model television receiver 10, assembled with a base 20*a* and a top frame 24*a* with added decoration 25. The styling of the base and top frame in this figure may be termed Colonial or Early American. Of course, other forms of base and top frames could be used to reflect furniture styles such as Contemporary, French Provincial, etc. It may be noted that the receiver 10 is enclosed in a cabinet having plain sides and top and a minimum of additional decoration on the escutcheon panel 26 and the bezel 28. Various units of the receiver 10 may be finished in different colors or wood forms in order to best match particular base and top frame attachments. However, other than differing finishes for the exterior of the cabinets of the receiver 10, each receiver may be rather plain and identical with another so that the style and appearance thereof is primarily determined by the base and top frame.

Figure 4:
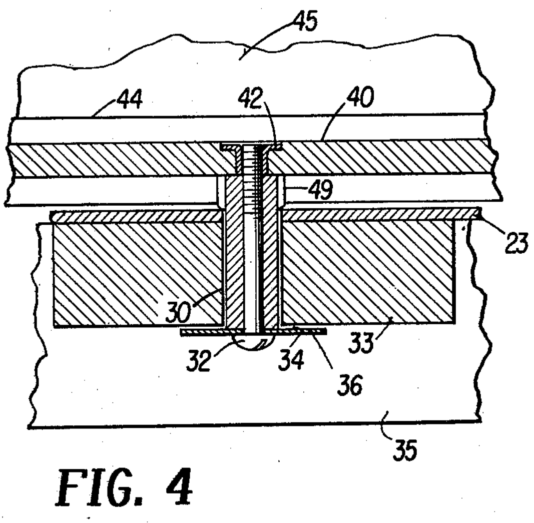
FIG. 4 is a sectional view along the line 4—4 of FIG. 3.

FIG. 3 shows the receiver of FIG. 1 from the rear with the glides and stops in phantom. It may be noted that the base top 23 includes an aperture 30 through which a mounting bolt 32 and spacer bushing 34 extend from the underside of the base (FIG. 4). In order to give desirable strength to the base 20, a cross member 33 extends between the facing members 35 of the base, only one of which is shown. As best seen in FIG. 4, the bottom panel 40 of the television receiver 10 includes a T nut 42 mounted on the top surface thereof to receive a threaded portion of the bolt 32 which extends within bushing 34 and through the cross member 33 and the aperture 30. A washer 36 is inserted between the head of bolt 32 and the lower end of spacer bushing 34 so that the bolt may be tightened to secure bushing 34 against the bottom panel 40. Washer 36 will, of course, prevent the separation of the receiver from the base 20. Aperture 30 is large enough to permit pivotal movement of the entire bushing assembly therein. The bottom panel 40 is secured to a side framing member 44 of the television receiver 10, which side framing member is covered by the back panel 45 of the television receiver 10.

Figure 5:
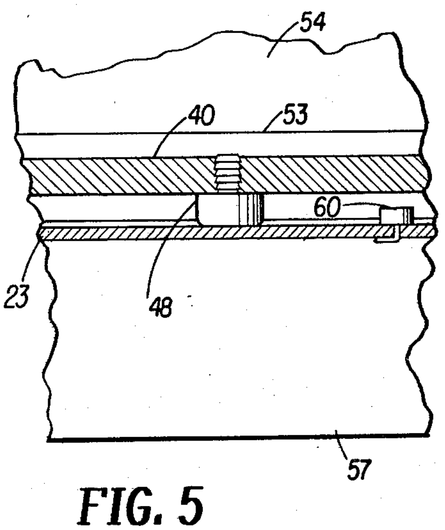
FIG. 5 is a sectional view along the line 5—5 of FIG. 3.

As shown in FIG. 5, the bottom panel 40 includes a glide foot 48 which, together with further glide feet 49—51 (FIG. 3), supports the receiver 10 on the base top 23. The feet 48—51 are preferably formed of nylon to facilitate swiveling of the receiver on the base top 23. In FIG. 5 there is also visible the interior framing member 53 of the television receiver which member is covered by the side panel 54 thereof (see also FIG 2). Stop members 60 and 61 are installed in the top 23 of the base and these are respectively engageable with the feet 48 and 51 in order to limit pivotal movement of the receiver 10. As shown in FIG. 3, stop 60 will limit clockwise swiveling of the receiver and stop 61 will limit counter clockwise swiveling thereof.

Figure 6:
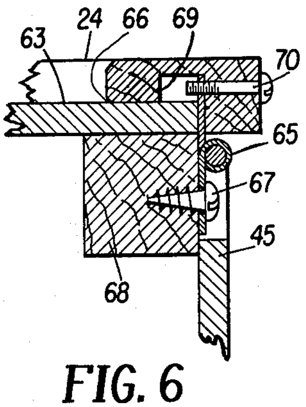
FIG. 6 is a sectional view along the line 6—6 of FIG. 3.

The rectangular top frame, which is preferably open in the center thereof, is secured to the back of the receiver 10 by means of hinges 64 and 65. A panel 24*c* could be installed in the center of frame 24*d* as shown in FIGS. 7 and 8 to form a removable tray (not hinge mounted). Frame 24 rests on the top 63 of receiver 10, and has a bevel or vein line 66 running along its lower interior edge. A single self-tapping screw such as 67 is inserted through an aperture in each of the hinges and secured to the back frame member 68 of the receiver. As seen in FIG. 6, the underside of the top frame 24 includes a recess 69 into which one portion of the hinges extend. An aperture in the hinges is tapped for the machine screws such as machine screw 70 which is inserted from the back edge of the frame 24 to hold the hinge 65 in place. It may be noted that the outer rim of the frame 24, in both the hinge mounted version of FIG. 6 and the tray version of FIG. 8, extends down the sides of the television receiver by a small amount in order to conceal the intersection of the frame with the top of the receiver.

The top frame 24 is entirely secured by means of two hinges at the rearward edge thereof permitting the top frame to hinge upwardly if an attempt is made to grasp this frame while moving the television receiver. It has been found preferable to permit this movement of the frame to indicate to persons that the frame should not be used in moving the relatively heavy receiver. To secure the top frame in place by any other simple means, would permit the possibility of the frame working loose if it were used for moving the receiver. There could, therefore, be damage to the receiver through dropping thereof or breakage of the cabinet assembly. Removability of the top frame is additionally advantageous in that it permits easy cleaning of the receiver top.

In the above described cabinet attachment it may be seen that the assembly can be simply made by relatively unskilled persons since it is only necessary to provide the glide feet for the bottom of the cabinet, install a pivotal mounting bolt 32, and secure two mounting screws for the top frame of the assembly. In this way, a single table model television receiver can be made into several different furniture styles to match any particular room decor. Furthermore, the arrangement permits swiveling of the receiver while still maintaining the appearance of the furniture styled console unit.

I claim:

1. Apparatus to convert a table model television receiver to a console model including in combination, a base assembly having four legs and a base top, means for securing a television receiver to said base top, said means including a pivot post adapted to be connected directly to the television receiver and pivotally engaging said base glide feet adapted to be fixed to the bottom of the receiver for supporting the same on said base top, stop members for limiting pivotal movement of the receiver on said base top through engagement with said glide feet, and a frame means for the top of the television receiver, said frame means and said base assembly having matched furniture styling to coordinate with the styling of the television receiver.

2. Television receiver apparatus including in combination a table model television receiver, a base assembly having four legs and a base top, said base top having a central aperture therein, a threaded fastener and a bushing secured centrally of the bottom of said receiver with said bushing positioned in said aperture for pivotally securing said receiver to said base top, glide feet secured to the bottom of said receiver and supporting the same on said base top, stop members secured to said base top engaging said glide feet and limiting pivotal movement of said receiver, a separate rectangular top frame for said receiver, and pivotal means for securing said top frame to the back of said receiver, said top frame and said base assembly having matched furniture styling to determine the styling of said television receiver apparatus.

3. Television receiver apparatus including in combination, a table model television receiver, a base assembly having four legs and a base top, said base top having a central aperture therein, a threaded fastener and a bushing secured centrally of the bottom of said receiver with said bushing positioned in said aperture for pivotally securing said receiver to said base top, glide feet supporting said receiver on said base top, a separate rectangular top frame for said receiver, said frame encircling the periphery of the top of said receiver and overhanging the edges thereof, said rectangular top frame being unsecured to said receiver on at least three sides thereof to be raised free of said receiver upon application of upward force thereto, said top frame and said base assembly having matched furniture styling to determine the styling of said television receiver apparatus.

4. The apparatus of claim 3 including a center panel secured to said frame to form a removable tray for placement on top of the receiver.

References Cited in the file of this patent

UNITED STATES PATENTS

| | | |
|---|---|---|
| 455,280 | Emerson | June 30, 1891 |
| 1,830,812 | Schloss | Nov. 10, 1931 |
| 1,857,640 | Johnson | May 10, 1932 |
| 2,618,526 | Septer | Nov. 18, 1952 |
| 2,687,267 | Copenhaver | Aug. 24, 1954 |
| 2,728,621 | Kempter | Dec. 27, 1955 |
| 2,806,754 | Abeles | Sept. 17, 1957 |
| 2,935,288 | Summerer | May 3, 1960 |
| 2,950,893 | McLarney | Aug. 30, 1960 |